July 1, 1969  C. F. G. DORE  3,452,452
SKELETAL MOLECULAR MODELS
Filed Aug. 28, 1967

United States Patent Office 3,452,452
Patented July 1, 1969

3,452,452
SKELETAL MOLECULAR MODELS
Charles Frank Gamblin Doré, Kenton, England, assignor to National Research Development Corporation, London, England, a British corporation
Filed Aug. 28, 1967, Ser. No. 663,878
Claims priority, application Great Britain, Sept. 6, 1966, 39,892/66
Int. Cl. G09b 23/24, 23/26; A63h 33/10
U.S. Cl. 35—18                        10 Claims

ABSTRACT OF THE DISCLOSURE

A device for representing an atom in a molecular model comprises an atomic unit having seven bond receivers each for receiving a linear element representing a valence bond, preferably in spigot and socket relationship. The bond receivers are oriented so that their axes radiate from a central point and consist of a first and second group of bond receivers, the first group consisting of four bond receivers oriented so that their axes are in substantially tetrahedral relationship, and the second group consisting of three bond receivers oriented so that their axes are substantially in equi-angular relationship in a plane. The first and second groups of bond receivers are oriented one to the other so that the axis of one bond receiver of the first group makes an angle of substantially 180° with the axis of one bond receiver of the second group, and the axis of another bond receiver of the first group makes an angle of substantially 105° with the axis of another bond receiver of the second group.

---

Figure 1:
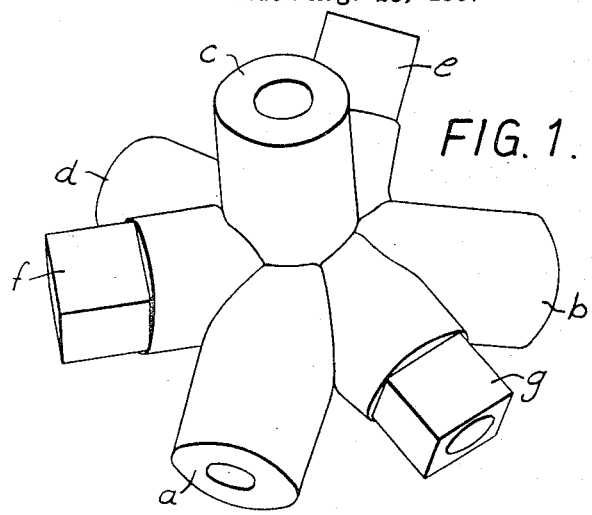

This invention relates to molecular models.

A number of systems for building models of molecules have been proposed in which units, each representing an atom, are detachably joined by rods representing interatomic bonds. A disadvantage of these systems is that a large number of units of different form must be provided to represent different types of atom, including different units to represent the different valency states of atoms such as carbon atoms.

It is an object of the present invention to provide a more adaptable device for use in the construction of molecular models.

Accordingly, the invention provides a device for representing an atom in a molecular model which comprises an atomic unit having seven bond receivers each for receiving an element representing a valence bond, the bond receivers being oriented so that their axes radiate from a central point and consisting of a first and second group of bond receivers, the first group consisting of four bond receivers oriented so that their axes are in substantially tetrahedral relationship, and the second group consisting of three bond receivers oriented so that their axes are substantially in equi-angular relationship in a plane, the first and second groups of bond receivers being oriented one to the other so that the axis of one bond receiver of the first group makes an angle of substantially 180° with the axis of one bond receiver of the second group and the axis of another bond receiver of the first group makes an angle of substantially 105° with the axis of another bond receiver of the second group. The relative angles of the bond receivers may vary by small angles from those given above provided that the material from which the unit is made is sufficiently flexible to allow models to be built without undue strain in the model and with reasonable accuracy. The amount of variation which is permissible will, of course, depend on the material used and upon the accuracy which is desired. Preferably the variation should not be more than ±5°.

The invention also provides an assemblage for the construction of molecular models comprising a plurality of devices for representing atoms as described above and a plurality of linear elements representing valence bonds to be received by the bond receivers.

The unit is preferably made of a moulded thermoplastic material such as nylon, polythene or polypropylene, and should be flexible enough to allow each bond receiver to bend about 8° to either side of its normal position.

The bond receivers and the elements representing valence bonds may be connected together in spigot and socket relationship. The device may, for example, be made up of seven rods connected together at their inner ends, over which tubes may be fitted to represent valence bonds, or the device may have sockets into which rods may be fitted.

Preferably the device comprises tubular socket members connected together at their inner ends. Straight rods of the correct cross-section to fit into the sockets may then be used to represent vaence bonds. The socket members and valence bond elements may be adapted to be connected together by a connection of the "poppet" type, that is, the valence bond element has a nodule near its end and the socket has a corresponding internal groove adapted to hold the nodule. Each socket may have a number of internal grooves spaced apart, thus enabling the distances between the centres of the devices representing atoms to be varied according to which of the internal grooves hold the nodules.

It is desirable that relative rotation between two devices joined by an element representing a double or triple bond should be prevented. Thus when the device comprises tubular socket members, at least one of those members may have a rectangular external cross-section. Valence bond elements in the form of rectangular cross-section tubes may then be fitted over such socket members in two model atoms. Alternatively the members may be joined using ordinary valence bond elements to give the correct separation and then a clip having a rectangular U-shaped cross-section may be put over the members to prevent relative rotation of the model atoms, or an ordinary valence bond element and a rectangular cross-section tube may be used together, to give the correct separation and prevent relative rotation respectively.

A further method of representing a double bond is to use two curved valence bond elements each fitting into a socket in each of the two devices joined by the bond. This method may be preferred for use when models are to be made for teaching purposes, as the double bond is represented by two bond elements and so gives a good demonstration of the nature of the bond.

If desired, atoms of different elements may be represented by devices of different colours. These devices will all take the same form and thus may be made using the same mould.

Since hydrogen atoms have normally only one bond they may conveniently be represented, not by devices according to the invention, but by small spheres having means for attaching them to the bond receivers of the devices.

Valence bond elements having a variety of lengths, or which may be cut to give the required lengths, are provided and when two model atoms are to be joined together a valence bond element is used of a length such that the centres of the model atoms are separated by a distance corresponding to the appropriate inter-atomic distance on the scale of the model. The rods may, for example, be made of aluminium, the different lengths being dyed different colours for identification.

Figure 2:
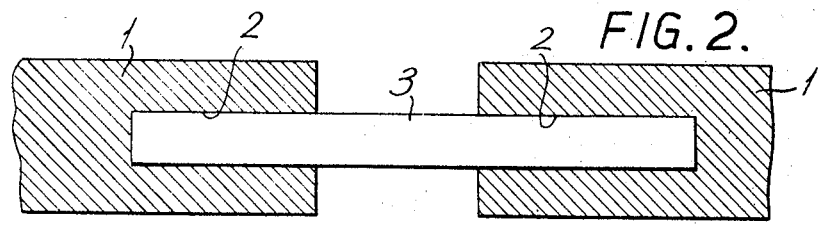
Figure 3:
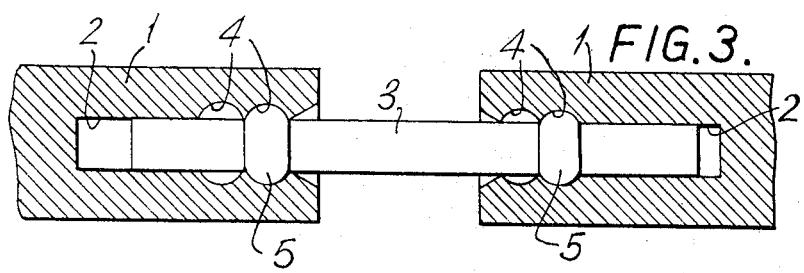
Figure 4:
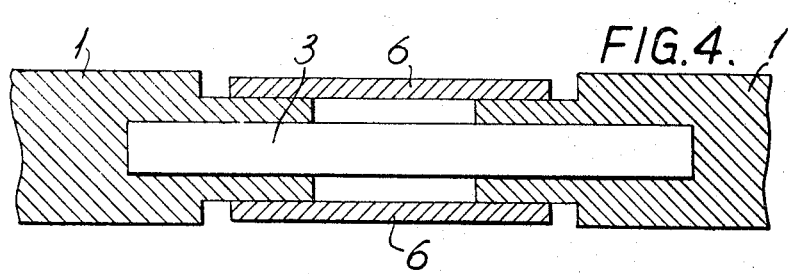

Specific embodiments of the invention will now be described with reference to the accompanying drawings, of which FIG. 1 is a perspective view of a device according to the invention. FIGS. 2 and 3 are sectional views of socket members of different types connected by valence bond elements of different types, and FIG. 4 is a sectional view of two socket members connected by elements representing a double bond.

FIG. 1 shows a device moulded from nylon having seven tubular socket members (*a*, *b*, *c*, *d*, *e*, *f* and *g*). Four of the members (*a*, *b*, *c* and *d*) are arranged in tetrahedral relationship and the other three members (*e*, *f* and *g*) are arranged in equi-angular relationship in a plane. The members *e*, *f* and *g* each have a square external cross-section at their outer ends. The members *a* and *e* lie in a straight line, and the member *c* makes an angle of 105° with the member *g*.

When the device is used to represent different types of atoms the members are used as follows:

Carbon (tetrahedral)—*a*, *b*, *c*, *d*.
Carbon (ethylenic:carbonyl:aromatic—*e*, *f*, *g*.
Carbon (acetylenic)—*a*, *e*.
Nitrogen (amide)—*e*, *f*, *g*.
Nitrogen (amine)—*a*, *b*, *c*.
Nitrogen (azide)—*a*, *b*.
Nitrogen (azo)—*e*, *f*.
Nitrogen (quaternary aromatic)—*e*, *f*, *g*.
Nitrogen (quaternary tetrahedral)—*a*, *b*, *c*, *d*.
Oxygen (divalent)—*c*, *g* (105° as in water) or *a*, *c* (109.5° in substances where the angle is larger).
Silicon (tetrahedral)—*a*, *b*, *c*, *d*.
Sulphur (divalent)—*c*, *g*.
Sulphur (tetrahedral)—*a*, *b*, *c*, *d*.

FIG. 2 shows two tubular socket members 1 having sockets 2 joined by a valence bond element 3.

FIG. 3 shows two socket members 1 having sockets 2 joined by a valence bond element 3. The sockets 2 in this embodiment each have two internal grooves 4, one of which holds a nodule 5 on the valence band element 3. The distance between the model atoms having the socket members 1 depends on which of the internal grooves 4 hold the nodules.

FIG. 4 shows socket members 1 with square external cross-section which are joined by a valence bond element 3 and also by a square cross-section tube 6. Valence bond element 3 gives the correct separation between the model atoms having the socket members 1 and the square cross-section tube 6 prevents relative rotation between the model atoms.

1. A device for representing an atom in a molecular model which comprises an atomic unit having seven bond receivers each for receiving a linear element representing a valence bond, the bond receivers being oriented so that their axes radiate from a central point and consisting of a first and second group of bond receivers, the first group consisting of four bond receivers oriented so that their axes are in substantially tetrahedral relationship, and the second group consisting of three bond receivers oriented so that their axes are substantially in equi-angular relationship in a plane, the first and second groups of bond receivers being oriented one to the other so that the axis of one bond receivers of the first group makes an angle of substantially 180° with the axis of one bond receiver of the second group and the axis of another bond receiver of the first group makes an angle of substantially 105° with the axis of another bond receiver of the second group.

2. A device according to claim 1, wherein the bond receivers are constructed to receive the elements representing valence bonds in rod and socket relationship.

3. A device according to claim 2, constructed of a moulded thermoplastic material.

4. A device according to claim 2, wherein the bond receivers are sockets.

5. A device according to claim 4, wherein the sockets are adapted to be connected to elements representing a valence bond by connections of the "poppet" type.

6. A device according to claim 4, wherein the device comprises tubular socket members connected together at their inner ends.

7. A device according to claim 6, wherein at least one tubular socket member has a rectangular external cross-section.

8. An assemblage for the construction of molecular models comprising a plurality of devices according to claim 1 and a plurality of elements representing valence bonds to be received by the bond receivers.

9. An assemblage for the construction of molecular models comprising a plurality of devices according to claim 4 and a plurality of linear elements in the form of rods to be received by the sockets.

10. An assemblage for the construction of molecular models comprising a plurality of devices according to claim 7, a plurality of linear elements in the form of rods to be received by the sockets and a plurality of rectangular tubular elements to be received on the tubular socket members having rectangular external cross-section.

References Cited

UNITED STATES PATENTS 2,974,425  3/1961  Dreiding.
3,333,349  8/1967  Brumlik.

FOREIGN PATENTS 545,995  7/1956  Italy.

EUGENE R. CAPOZIO, *Primary Examiner.*

HARLAND S. SKOGQUIST, *Assistant Examiner.*

U.S. Cl. X.R.

46—23, 26, 29